Patented Feb. 22, 1927.

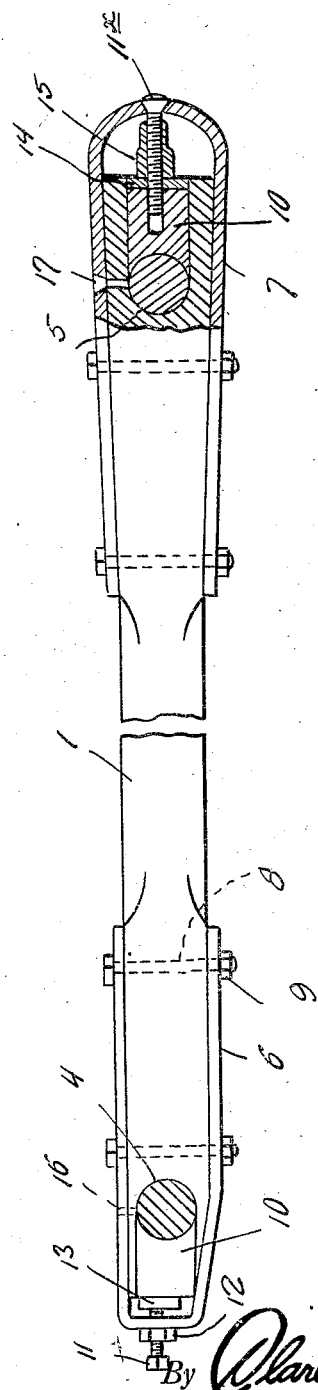

1,618,320

UNITED STATES PATENT OFFICE.

ARCHIE WIRTH, OF SUTTON, NORTH DAKOTA.

ADJUSTABLE PITMAN FOR MOWERS, BINDERS, AND THE LIKE.

Application filed December 11, 1925. Serial No. 74,779.

My present invention pertains to pitmen such as employed in mowers, binders and the like; and it has for its object to avert bending or breaking of such pitmen due to too much lost motion, the desired end indicated being attained by the incorporation in the end portions of a pitman of means whereby wear and play may be taken up without the employment of skilled labor or any tools other than an ordinary wrench, and moreover play and lost motion may be taken up expeditiously and easily without the necessity of disconnecting the pitman from the working parts between which it is interposed.

Other objects and practical advantages of the invention will be fully understood from the following description and claims when the same are read in connection with the drawing, accompanying and forming part of this specification, in which:—

The figure is a view partly in elevation and partly in section illustrative of the pitman constituting the preferred embodiment of my invention as the same appears when interposed between a sickle pin and a revolving shaft or crank pin.

The body or major portion of my novel pitman is designated by 1, and within the purview of my invention the said body 1 may be formed of hard wood or of steel or of other appropriate material in the discretion of the manufacturer. A sickle pin 2 and a crank pin or revolving shaft pin 3 are shown in association with the novel pitman, the said pins being disposed in concave seats 4 and 5 located in the end portions of the body 1. Straddling the said end portions of the body 1 are metallic straps 6 and 7, the said straps being fixedly connected to the body 1 through the medium of bolts 8, equipped with nuts 9. Movable rectilinearly in the end portions of the body 1 and located at the opposite sides of the mentioned pins, with reference to the concave seats, are bearing blocks or followers 10 which in the discretion of the manufacturer may be of wood, steel or other appropriate material. The said blocks 10 are adjustably connected with the bights of the loop-shaped straps and hence the blocks 10 may be expeditiously and easily adjusted to take up or compensate for wear, may be adjustably fixed with respect to the pitman and the pins before mentioned, with the result that breaking or bending of the pitman will be averted, and the transmission of motion from one of the pins to the other will be maintained without lost motion and consequent lack of efficiency.

Any appropriate means may be employed for adjusting and adjustably fixing the blocks 10 without departure from my invention. I prefer, however, to employ in connection with one of the blocks 10 a screw 11 bearing in the bight of the adjacent strap 6 and equipped with a lock nut 12 and with a follower 13, the latter being opposed to the outer end of the adjacent block 10 so that when the screw 11 is adjusted and is adjustably fixed by the lock nut $10^x$, the said screw in combination with its follower 13 may be depended upon to preclude casual outward movement of the block 10. For the adjustment and adjustable fixture of the other block 10, namely, the block 10 at the right of the figure in the drawing, I prefer to employ a screw $11^x$, fixed to the bight of the strap 7 and disposed in a smooth bore in the block 10, and I also prefer to employ a follower 14 against the outer end of the block 10 and about the screw $11^x$, and a nut 15 surrounding and threadedly engaging the screw and bearing against the said follower. The head of the screw $11^x$ is disposed in a countersink in the bight of the strap 7, and while I prefer to fix the screw $11^x$ to the said bight by welding at the point 20, I would have it understood that within the purview of my invention the screw $11^x$ may be fixed to the said bight in any approved manner. The nut 15 is of exterior angular cross-section, and hence may be turned with facility by hand when it is desired to crowd the block 10 inwardly against the adjacent pin with a view to taking up wear and avoiding lost motion.

The strap 6 is provided with a lubricant duct 16, and the strap 7 is provided with a similar duct 17, the said ducts being in coincidence with apertures in the body 1 through which lubricant may find its way to the pins and the pin bearings.

By virtue of the construction of my novel pitman as set forth, it will be readily noted that wear may be taken up without entailing removal of the pitman from an apparatus, and without the employment of skilled labor, and by virtue of the capacity of function ascribed to my novel pitman the usefulness of the pitman may be materially prolonged as well as the usefulness of the parts directly associated with the pitman.

It will also be appreciated from the foregoing that my improvement adds but little to the cost of production of a pitman, and the improvement does not in any degree render the pitman cumbersome or unduly heavy.

I have specifically described the present and preferred embodiment of my invention in all of its details in order to impart a full, clear and exact understanding of the said embodiment. I do not desire, however, to be understood as confining myself to the specific construction and relative arrangement of parts, my invention being defined by my appended claim within the scope of which structural changes and changes in arrangement may be made without departure from my invention.

Having described my invention, what I claim and desire to secure by Letters Patent, is:—

A pitman having in combination a body with a bearing in its end portion and a longitudinal guide outwardly beyond said bearing, a U-shaped strap straddling the said body at the end thereof and connected to the body, said strap having a bight and a countersink in the center of said bight, a block movable rectilinearly in said guide and having a bore of smooth type and also having an inner bearing portion, a screw having a head fixed in the counter sink in the bight of said strap and also having a shank disposed in said smooth bore, a follower loose about the screw and opposed to the outer end of the block, and a nut turnable about the screw and arranged at the outer side of the said follower.

In testimony whereof I affix my signature.

ABCHIE WIRTH.